United States Patent Office 2,839,099
Patented June 17, 1958

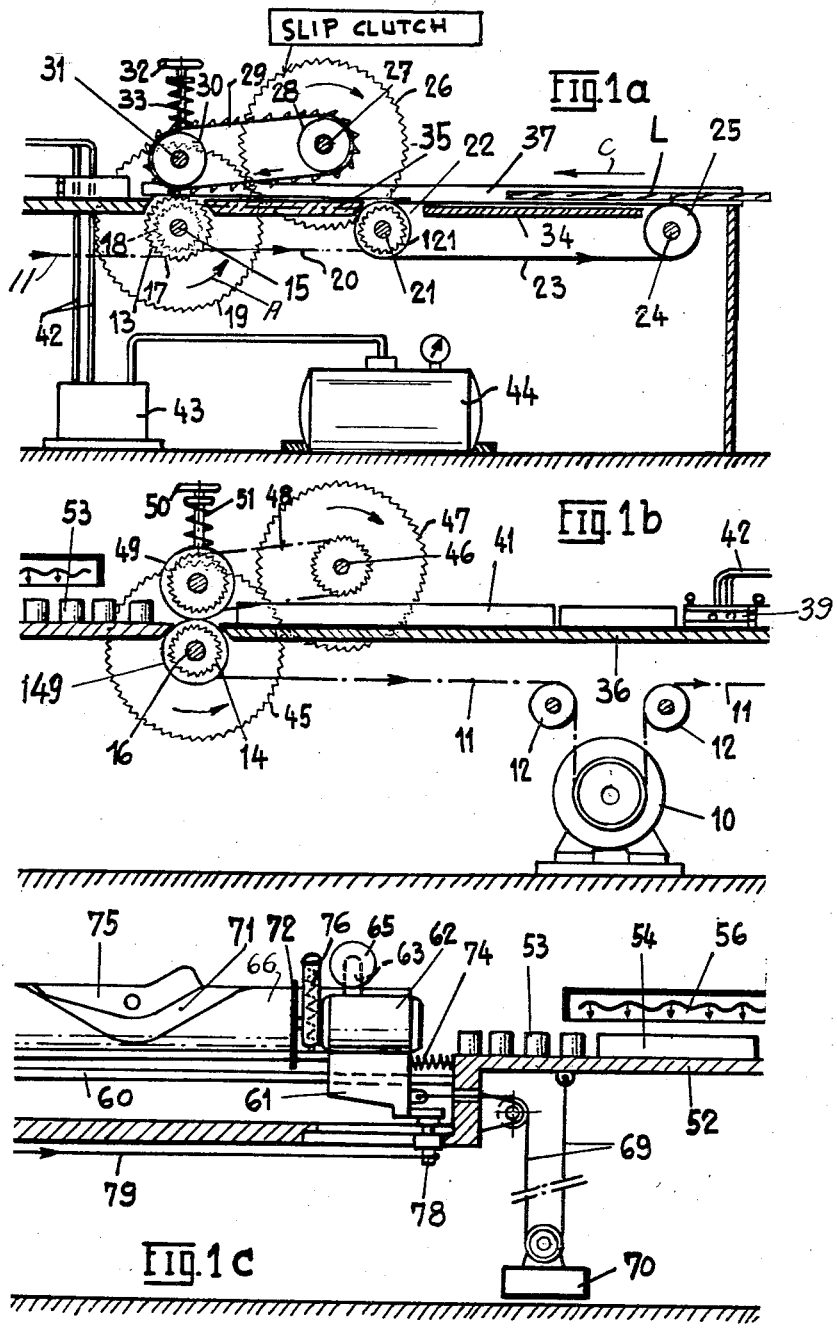

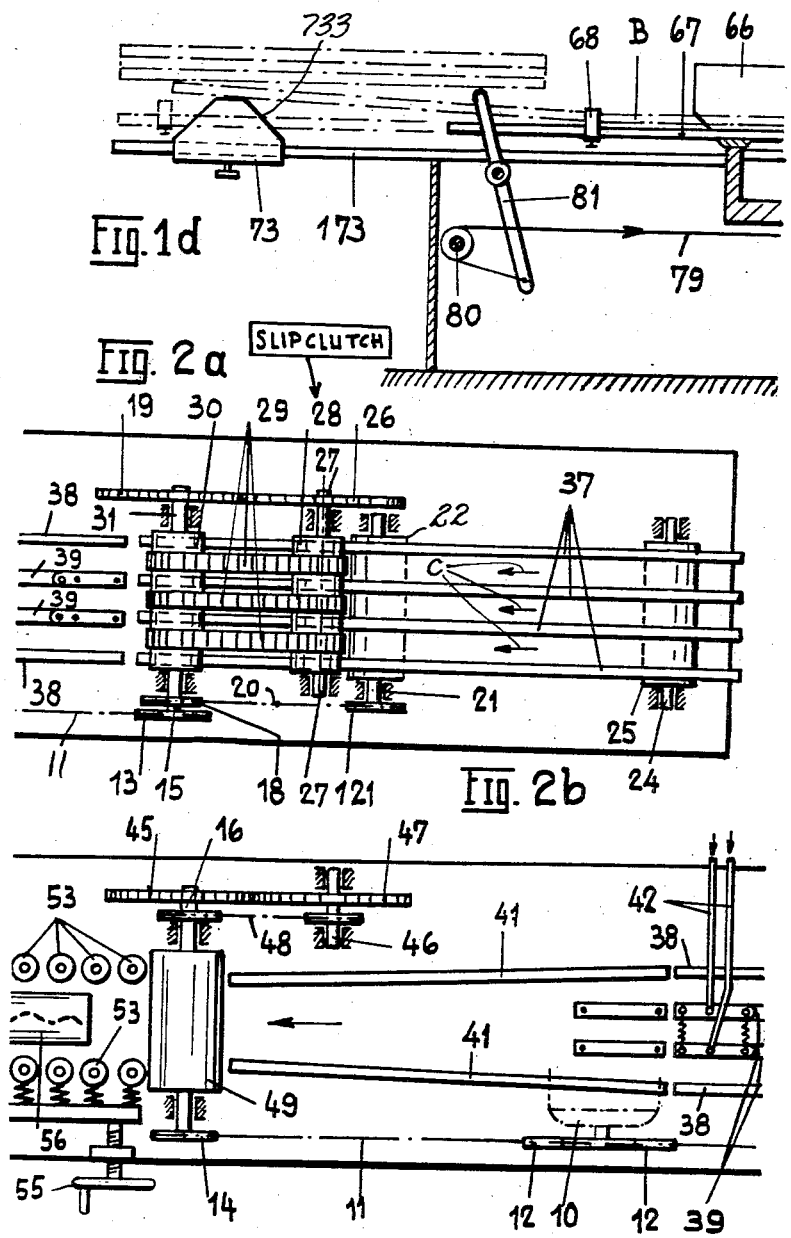

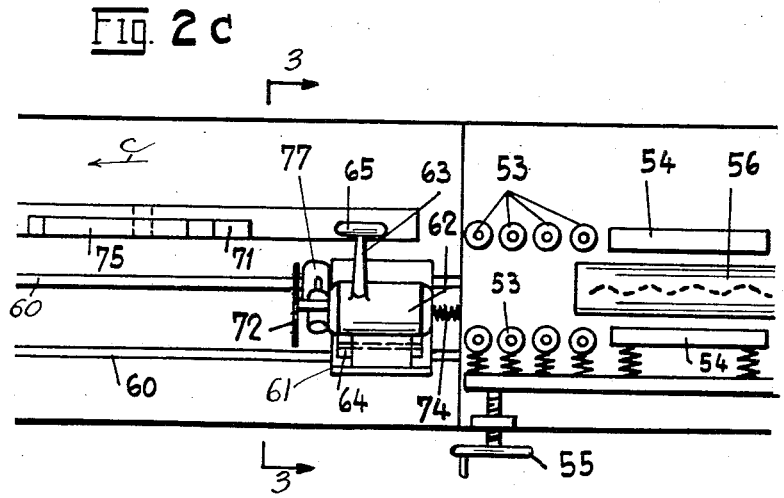
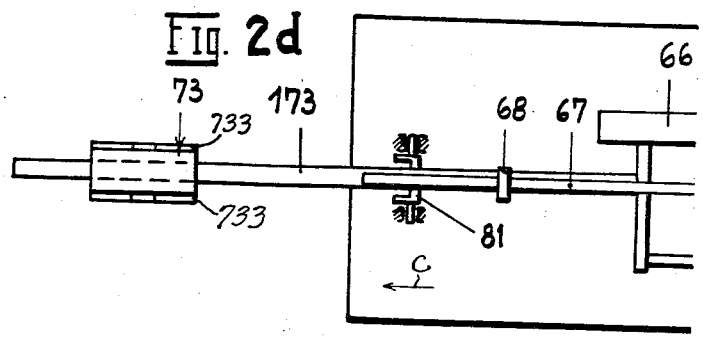
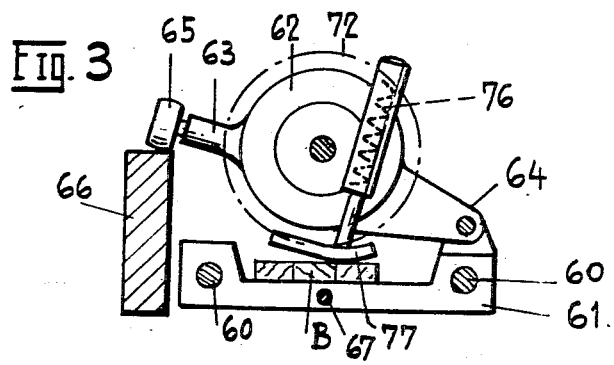

2,839,099

MACHINE PLANTS FOR THE CONTINUOUS AUTOMATIC PRODUCTION OF PLANKS OF PREDETERMINED LENGTH

Walter Müller, Auw, Switzerland

Application May 4, 1955, Serial No. 506,023

Claims priority, application Switzerland May 6, 1954

3 Claims. (Cl. 143—47)

The invention relates to a machine plant for the production of planks. Its main object is the continuous production of such planks, the cutting of the same into sections of a predetermined length and the stacking of said sections.

The invention will now be described more in detail and with reference to the accompanying drawings, wherein Fig. 1 is a sectional elevation shown in consecutive sections as Figs. 1ª, 1ᵇ, 1ᶜ, and 1ᵈ, Fig. 2 is a plan view shown in consecutive sections as Figs. 2ª, 2ᵇ, 2ᶜ, and 2ᵈ, Fig. 3 is a transverse section of a detail along the line III—III of Fig. 2ᶜ on a larger scale.

The laths L, cut to the appropriate size, are placed side by side and parallel to one another on a table 34 (shown on the right hand side of Fig. 1) and are moved by transporting means to be described later more in detail towards the left in Fig. 1 and 2 over the table 34 and tables 35, 36 arranged in the same horizontal plane.

These transporting means are driven from a motor 10 by means of an endless chain 11, which is passed over return sprocketed wheels 12 and over sprocketed wheels 13 and 14 on the shafts 15 and 16 respectively, which are thereby driven in the direction of the arrow A. On the shaft 15 a feeder roller 17 having a smooth surface, a sprocketed wheel 18 and a gear wheel 19 are mounted. From the sprocket wheel 18 a sprocket wheel 121 on a shaft 21 is driven by means of a chain 20, and by this shaft a driving roller 22 for an endless conveyer belt 23, which belt is passed over the surface of the said table 34 and around a carrier roller 25 mounted on a shaft 24.

The gear wheel 19 is in mesh with a gear wheel 26 mounted on a shaft 27. On this shaft 27 is mounted a carrier roller 18 for ribbed endless caterpillar bands 29, which are passed also over a carrier roller 30. The carrier roller 28 is preferably provided with slip coupling means in such a manner that the feed can be effected by each caterpillar band 29. This may be of importance when an elongated lath of non-standard height brings its associated caterpillar band to a standstill. The other elongated laths are then carried along, independently of the arrested one. The shaft 31 of the last mentioned carrier roller 30 can be forced downwardly with a pressure force selected by means of a hand wheel 32 and of a spring 33.

The shaft 27 of the roller 28 is positively connected with the shaft 15 by means of the meshing gears 26 and 19. The carrier roller 30 is freely turnable together with the shaft 31, but is pressed downwardly by the pressure force of the spring 33. The caterpillar bands 29 are driven from the roller 28; if for some reason the feed of the board is blocked, the bands 29 can slide on the roller 28, owing to the aforementioned slip coupling.

The shafts 15, 16, 21 and 24 are mounted parallel to one another. The aforesaid fixed table tops 34, 35, 36 are arranged in alignment in a horizontal plane above the shafts 16, 15, 21.

Above the table top 34 and the conveyer belt 23 and table top 35, respectively, parallel stationary guides 37 are arranged in the direction C of the feed in alignment, with which outer, fixed, guides 38 and inner, movable, guides 39 are arranged over the table top 36. In alignment with the outer guides 38, further outer guides 41 are arranged over the table top 36, the horizontal distance between which diminishes uniformly in the direction C of the feed.

The inner guides 39 are hollow bodies having discharge holes for glue at their flank faces. Liquid glue is supplied to them through pipes 42 from a glue container by the action of an air compressor 44.

A gear wheel 45 mounted on the shaft 16 meshes with a gear wheel 47 mounted on a shaft 46 from which a ribbed feeder roller 49 is driven through a chain drive 48, which roller can be pressed downwardly at an adjustable force by the aid of a hand wheel 50 and of a loading spring 51. A lower, smooth, feeder roller 149 is mounted on the shaft 16.

The manner of operation of the components of the machine described so far is as follows:

When elongated laths L, cut to size and planed, are pushed from the feeder table 34 onto the conveyer belt 23 between the guides 37, the same are pressed by the action of the conveyer belt 23 and of the caterpillar bands 29 onto the table tops 35 and 36, and are pushed towards in the direction C, the left. They then get over the table top 36 between the flank faces of the guides 38 and 41 which are angularly related. By the guides 41 the laths with the glue applied to them are pushed towards one another, and are then pressed once more on the table top 36 by the feeder roller 49.

The table top 36 is continued by a table top 52 on the sides of which pressing rollers 53 and abutment ledges 54 bear resiliently on the side faces of the boards B composed of the laths, the effective pressure force being adjustable by a hand wheel 55. Over the table top 52 an area radiation heating element 56, for instance an infra-red radiation- or high frequency heating-element, is arranged by the action of which the glue joints are dried quickly. At the end of the table top 52 accordingly the composite lath boards B emerge readily glued.

The subsequent section of the machine comprises two parallel guide bars 60 for a slidable motor saw carriage 61. Laterally on the carriage 61 the motor casing 62 is supported by a pivoted pin 64 with the aid of a transverse bar 63, while a roller 65 at the other end of the bar 63 contacts an upper guide face of a stationary cam 66. From the carriage 61 a pull rod 67 with an adjustable abutment 68 projects in the direction C of feed of the glued boards B. When the forward front edge of the board B strikes this abutment 68, the carriage 61 with the motor casing 62 is pulled forward in direction C by the pull rod 67; thereby a counterweight 70 is raised by the shortening of the suspension length of a cord line 69.

When then the guide roller 65 reaches a recess 71 of the cam 66, the rotary saw 72 of the motor 62 cuts the board B off transversely, while travelling in the direction of feed of the board B at the same speed. Later the guide roller 65 is raised again to its former level, so that the rotary saw 72 is lifted off the board again. When the forward front edge of the board B reaches a member 73 which is adjustable along guide rods 173 the front edge of the board slides on the inclined upper surfaces 733 of the member 73 and thereby is raised and is removed from the abutment 68, so that the carriage 61 with the motor 62 is no longer urged in direction C, and rolls back under the action of the weight 70, until the carriage 61 abuts on a buffer spring 74.

On the transverse bar 63 a presser shoe 77 is mounted, which is pressed downwardly by the action of a spring 76.

On the carriage 61 a pin 78 is arranged from which a pull cord 79 runs over a stationary deflector roller 80 to a pivotally mounted lifting member 81, which raises the rear end of the cut off board when the carriage 61 moves back, in order that the next piece of board can be pushed under the same.

The lifting member 81 will be actuated during the beginning of the retraction movement of the carriage 61 and will remain in the board lifting position, lifting the stack of boards above it (Fig. 1ᵈ) until the carriage 61 has almost returned during its next forward movement to the forward-most position, so that the next succeeding board will be slid below the raised stack.

While I have described hereinabove and illustrated in the accompanying drawings what may be considered a typical and particularly useful embodiment of my said invention, I wish it to be understood that I do not limit myself to the particular details and dimensions described and illustrated, for obvious modification will occur to a person skilled in the art.

What I claim as my invention and desire to secure by Letters Patent, is:

1. In a board processing machine having means for continuously feeding a board in one direction, board severing means comprising in combination, a slide, a carriage movable on said slide in said direction of feeding and opposite thereto, a power saw mounted on said carriage, and being movable with said carriage and also in a transverse movement at right angles to the direction of board feeding into, and respectively out of, the feeding path of said board for board severing, abutment means connected to said carriage and operable to be releasably engaged by the leading edge of said board for moving said saw in said direction of feeding, retracting means operable for returning said saw in a direction opposite to said feeding direction upon release of the leading edge from the abutment means, and guiding means operable for guiding said saw during the transverse movement.

2. In a board processing machine, as claimed in claim 1, said guiding means including a stationary cam, a guide connected to said carriage and movable in a direction transversely of said feed direction, said saw including a circular saw blade journalled on said guide and movable therewith, the axis of rotation of said saw blade being parallel with said feed direction, said guide including an extension forming a cam followed for said cam.

3. In a board processing machine as claimed in claim 1, together with, means adjustably positioned in the path of said leading edge and operable to engage it to raise a portion of said board adjacent said leading edge thereby disengaging said leading edge from said abutment means.

References Cited in the file of this patent
UNITED STATES PATENTS

| | | |
|---|---|---|
| 915,504 | Sutter | Mar. 16, 1909 |
| 2,407,070 | Frame | Sept. 3, 1946 |
| 2,488,759 | Bolling | Nov. 22, 1949 |
| 2,620,837 | Quick | Dec. 9, 1952 |